United States Patent
Ruppert et al.

[15] 3,689,572
[45] Sept. 5, 1972

[54] AROMATIC HYDROXY COMPOUNDS

[72] Inventors: Heinrich Ruppert, Krefeld-Bockum; Hermann Schnell, Krefeld-Uerdingen, both of Germany

[73] Assignee: Farbenfabriken Bayer Aktiengesellschaft, Leverkusen, Germany

[22] Filed: Aug. 16, 1966

[21] Appl. No.: 572,863

Related U.S. Application Data

[63] Continuation of Ser. No. 187,215, April 13, 1962, abandoned.

[30] Foreign Application Priority Data

April 22, 1961 Germany..................F 33 738

[52] U.S. Cl...............260/619 B, 252/404, 260/479, 260/619 F, 260/620
[51] Int. Cl. ....C07c 39/12, C07c 39/14, C07c 39/16
[58] Field of Search...260/619 A, 619 B, 619 D, 620, 260/619 P

[56] References Cited

UNITED STATES PATENTS

| | | |
|---|---|---|
| 2,028,043 | 1/1936 | Britton et al............260/619 X |
| 2,515,906 | 7/1950 | Stevens et al..........260/619 A |
| 2,515,907 | 7/1950 | Stevens et al..........260/619 A |
| 2,625,568 | 1/1953 | Young et al............260/619 B |
| 2,634,297 | 4/1953 | Moyle....................260/619 B |
| 2,865,887 | 12/1958 | Mackenzie.............260/619 B |
| 2,905,737 | 9/1959 | Webb.....................260/619 A |
| 3,001,972 | 9/1961 | Christenson et al....260/619 B |
| 3,026,297 | 3/1962 | Spacht...................260/619 B |
| 3,094,508 | 6/1963 | Butterworth et al...260/619 A |
| 3,290,390 | 12/1966 | Prahl et al..............260/619 A |
| 3,301,818 | 1/1967 | Barton et al............260/619 B |

*Primary Examiner*—Leon Zitver
*Assistant Examiner*—Norman Morgenstern
*Attorney*—Connolly and Hutz

[57] ABSTRACT

Hydroxy substituted xylenes of the formula

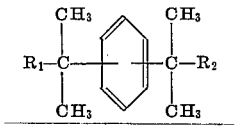

wherein $R_1$ and $R_2$ are individually defined as monohydroxyphenyl, dihydroxyphenyl, alkyl-monohydroxyphenyl, cycloalkyl-hydroxyphenyl, phenyl-hydroxyphenyl, monohydroxyhalophenyl and monohydroxynaphthyl.

4 Claims, No Drawings

AROMATIC HYDROXY COMPOUNDS

This application is a continuation of application Ser. No. 187,215, filed Apr. 13, 1962, now abandoned.

The present invention is concerned with new aromatic hydroxy compounds and with the production thereof.

The new aromatic polyhydroxy compounds (—1,3 and —1,4) of the present invention have the formula:

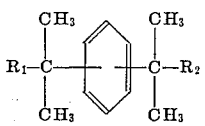

wherein $R_1$ and $R_2$ are identical or different and denote mono- or di-hydroxyphenyl, monohydroxyalkyl- or -arylphenyl, monohydroxyhalophenyl or monohydroxynaphthyl radicals.

The new compounds may be obtained by reacting at temperatures from room temperature up to about 120°C. one mol of a compound of the formula:

II 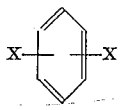

wherein the two X's are in the p- or m-position to one another and stand for

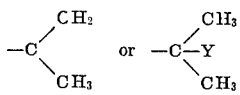

and wherein Y denotes a halogen atom or a hydroxyl, hydroxalkyl, hydroxaryl or an oxyacyl radical, with at least two moles of a phenol, a dihydroxy-benzene, an alkyl-, cycloalkyl-, phenyl- or halophenol or a naphthol.

Said hydroxy aryl compounds which may be reacted with the compounds according to formula II include, for instance, phenol, pyrocatechol, resorcinol, hydroquinone, o-, m- and p-cresol, o-, m- and p-ethyl-, propyl-, tert.butyl, cyclopentyl-and p-cresol, cyclohexyl-phenol, 2,6- and 3,5-dimethyl- and diethyl-phenol, o-, m- and p-phenyl-phenol, o-, m- and p-chloro- and bromo-phenol, 2,6- and 3,5-dichloro- and dibromo-phenol, 2-methyl-6-chloro-phenol and the napthols.

If the two X's in Formula II denote

then p- or m-di-isopropenyl-benzene is concerned, which may be obtained by dehydrogenation of the corresponding diisopropylbenzene or by splitting off water from the corresponding dicarbinols, or by splitting off hydrogen halide from the corresponding di-halogen compounds. By reacting these compounds with an aromatic hydroxy compound of the aforesaid type, especially high yields of the new hydroxy compounds according to the present invention are obtained if the reaction components are reacted with one another in the presence of catalytic amounts of a strong acid, such as hydrogen fluoride, hydrogen chloride, hydrogen bromide, perchloric acid, sulphuric acid, benzene- or toluene-sulphonic acid, pyrophosphorous acid, or an acidic ion exchanger. Surprisingly, polymerization of the isopropenylbenzenes, known to take place readily by the use of Friedel-Crafts' catalysts, such as tin tetrachloride, aluminum chloride, and boron fluoride addition compounds with phenol, tetrahydrofurane and so on, practically does not occur in this case.

The acid catalysts may be used in amounts from about 0.1 to about 5 percent by weight related to the mixture of the reaction components.

If the two X's in Formula II denote

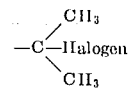

there are concerned $\alpha,\alpha,\alpha',\alpha'$-tetramethyl-p- or -m-xylylene-dihalides, such as -dichlorides or -di-bromides, obtainable in excellent yield by the action of a halogen upon the corresponding diisopropylbenzene.

The reaction of these xylylene dihalides with a phenol of the aforesaid type is performed by mixing the two reaction components at room temperature, optionally adding a small amount of solvent, such as benzene. A catalyst is not necessary in this case. The reaction starts spontaneously with the evolution of hydrogen halide and is completed after a few hours, the corresponding hydroxy compound crystallizing out. The reaction can also be carried out at an elevated temperature, although the proportion of secondary products, especially o-isomers, rises slightly.

If the two X's in the Formula II denote

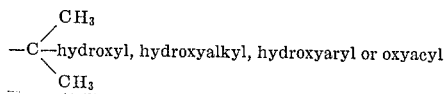

there are concerned $\alpha,\alpha,\alpha',\alpha'$-tetramethyl-p- or m-dihydroxy-, -dialkoxy-, diaroxy-xylylenes or esters of said dihydroxy xylylenes with carboxylic acids which can be obtained in good yield by the reaction of $\alpha,\alpha,\alpha',\alpha'$-tetramethyl-p- or m-xylylene dihalides with water, or the corresponding alcohols, phenols or carboxylic acids, under alkaline reaction conditions.

Examples of such xylylenes are: p- and m-($\alpha,\alpha,\alpha',\alpha'$-tetramethyl-$\alpha,\alpha'$-dihydroxy-, dimethoxy-, diethoxy-, dipropoxy- and diphenoxy)-xylene and the diacetate, dipropionate, dibutyrate and dibenzoate of said dihydroxy xylene.

The reaction of these xylylenes according to the present invention with a phenol of the above-mentioned type is also carried out in the presence of catalytic amounts of a strong mineral acid as mentioned above. The reaction proceeds the more rapidly, the more acid is used for the condensation.

The new aromatic hydroxy compounds of Formula I according to the invention can be used as anti-oxidants, for example for plastic materials, and as intermediates for organic syntheses.

The following examples are given for the purpose of illustrating the present invention:

EXAMPLE 1 a. A solution of 158 g. p-diisopropenyl benzene in 70 ml benzene is added dropwise to 376 g. phenol at 42°C. through a packed column in which the solution becomes saturated with gaseous hydrogen chloride. The hydrogen chloride escaping from the reaction mixture is continuously reintroduced into the reaction mixture with the solution running down through the packed column so that not more than a total of 6–8 g. hydrogen chloride is required. After a few hours, the bulk of the α,α,α',α'-tetramethyl-di-(p-hydroxyphenyl)-p-xylene formed has crystallized out. Hydrogen chloride and solvent are removed by suction. Excess phenol is removed by steam. The compound may be purified by recrystallization from hot benzene. 324 g. of the product are thus obtained (94 percent of the theoretical). The compound melts at 192°C. and can be distilled at 246°C./0.1 mm Hg.

b. To a mixture of 158 g. p-diisopropenyl benzene and 376 g. phenol there are added at 30°C., with vigorous stirring, 0.2 ml. 80 percent sulphuric acid. The reaction mixture initially solidifies in a gel-like form but again becomes liquid by the evolved reaction heat, the temperature rising to about 100°C. The reaction mixture is then kept at 100°C. by heating for about 40 minutes. After cooling, the reaction mixture is treated with 200 ml. water and exactly neutralized by the addition of a few drops of a sodium hydroxide solution. The excess of phenol is removed by blowing in steam. The resultant α,α,α',α'-tetramethyl-di-(p-hydroxyphenyl)-p-xylene (298 g. or 86 percent of the theoretical) can be obtained with a definite melting point by recrystallization from, for example benzene or by distillation at 0.1 mm Hg.

c. The process is carried out as described under (b), but 2 g. BF$_3$ · C$_6$H$_5$OH are added to the reaction mixture instead of sulphuric acid. The α,α,α',α'-tetramethyl-di(p-hydroxyphenyl)-p-xylene which crystallizes out is, in this case, contaminated with polymeric p-diisopropenyl-benzene. It is, therefore, dissolved in methanol and the bisphenol is separated by the introduction of ammonia in the form of an insoluble ammonium salt. The ammonia is driven off by heating with benzene and, after cooling, the α,α,α',α'-tetramethyl-di-(p-hydroxy-phenyl)-p-xylene is obtained pure in a yield of 202 g., corresponding to 58 percent of the theoretical.

d. The process is carried out as described under (c), but 5 g. aluminum chloride are added to the reaction mixture instead of BF$_3$·C$_6$H$_5$OH. The yield amounts to 214 g., corresponding to 62 percent of the theoretical.

e. The process is carried out as described under (a), but m-diisopropenyl-benzene is used instead of p-diisopropenylbenzene. There are thus obtained 291 g. (84 percent of the theoretical) α,α,α',α'-tetramethyl-di-(p-hydroxyphenyl)-m-xylene (melting point 135°C.).

f. The process is carried out as described under (a), but o-cresol is used instead of phenol. The yield of α,α,α',α'-tetramethyl-di-(4-hydroxy-3-methyl-phenyl)-p-xylene (melting point 155°–157°C.) amounts to 306 g. (83 percent of the theoretical).

EXAMPLE 2

Two hundred g. p-diisopropyl-benzene are diluted with 100 ml. benzene. Under irradiation with an ultraviolet lamp there is passed into this mixture, at about 15°C., a current of chlorine diluted with about five times its volume of carbon dioxide, at a rate of about 60 liters per hour. After about 1 hour, α,α,α',α'-tetramethyl-p-xylene-dichloride starts to separate out in crystalline form. Chlorination is continued as long as the crystal mass formed is still stirrable. The product is then filtered off and the mother liquor further chlorinated as described above. The crystals thus formed are also filtered off. The mother liquor is cooled to 5°C. and a further amount of the product thus obtained. A total of 262 g. (91.5 percent of the theoretical) of α,α,α',α'-tetramethyl-p-xylene-dichloride (melting point 62°C.) are obtained.

Two hundred thirty-one g. of the dichloride are introduced at 20°C., with stirring, into a mixture of 384 g. phenol and 100 g. benzene. After a few minutes, a violent evolution of hydrogen chloride sets in. After one hour, the α,α,α',α'-tetramethyl-di-(p-hydroxyphenyl)-p-xylylene begins to crystallize out. The reaction mixture solidifies after about 5 hours. The crystals formed are washed with a little benzene. Adhering phenol can be removed by steam. Three hundred twenty-two g. (93 percent of the theoretical) bisphenol are obtained.

EXAMPLE 3

Two hundred thirty-one g. α,α,α',α'-tetramethyl-p-xylylene dichloride are introduced, with stirring, into a solution of 90 g. sodium hydroxide in 800 ml. methanol. The temperature is kept at 40°C. by cooling. After 2 hours, the precipitated sodium chloride is filtered off and the bulk of methanol evaporated in a vacuum. The crystals thus formed are taken up in benzene and the benzene layer washed with water and dried. After distilling off the benzene, the α,α,α',α'-tetramethyl-α,α'-dimethoxy-p-xylene is distilled at 83°C/0.1 mm Hg. 176 g. (79 percent of the theoretical) of the compound are obtained in the form of white crystals of melting point 42°C.

The compound is used, as described in Example 1(a), instead of diisopropenyl-benzene, for the production of α,α,α',α'-tetramethyl-α,α'-di-(p-hydroxyphenyl)-p-xylene. From 111 g. thereof and 188 g. phenol there are obtained 146 g. bisphenol corresponding to 84.5 percent of the theoretical.

EXAMPLE 4

One hundred ninety-four g. (1 mol) α,α,α',α'-tetramethyl-α,α'-dihydroxy-m-xylene, obtained by the reduction of m-diisopropylbenzene-dihydroperoxide with sodium hydrosulphite, are introduced into a mixture of 384 g. phenol and 50 g. benzene. Gaseous hydrogen chloride is introduced into this mixture until it is saturated. After a few hours, the reaction mixture again evolves hydrogen chloride, α,α,α',α'-tetramethyl-α,α'-di-(p-hydroxyphenyl)-m-xylene separating out in crystalline form. After washing with water and drying, the compound can be distilled at 230°C/.1 mm Hg. 284 g. (82 percent of the theoretical) of the product are obtained.

EXAMPLE 5

To 470 grams phenol there are added at 150°C. 15 grams pyrophosphurous acid and then during 3 hours 158 grams p-di-isopropenyl-benzene. After stirring the mixtures at 50° to 60°C. for further 5 hours the crystal pulp thus obtained is neutralized. The crystals are separated and washed with water, melted and distilled under 0.1 mm Hg. at 246°C. 298 grams α,α,α',α'-tetramethyl-α,α'-di-( 4-hydroxy-phenyl)-p-xylene with the melting point 192°C. distil over.

EXAMPLE 6

The process is carried out as described in Example 5, but instead of pyrophosphurous acid there are used 2 grams phosphurous trichloride. One obtains 304 grams α,α,α',α'-tetramethyl-α,α'-di-(4-hydroxy-phenyl)-p-xylene.

EXAMPLE 7

The process is carried out as described in Example 6, but instead of p-diisopropenyl-benzene there are used 158 grams m-diisopropenyl-benzene. By distillation of the reaction product at 0.1 mm.Hg. there are obtained at 228°C. 301 grams α,α,α',α'-tetramethyl-α,α'-di-(4-hydroxy-phenyl)-m-xylene with the melting point 135°C.

EXAMPLE 8

To a benzene solution saturated at 40°C. with 150 grams 2,6-diethyl-phenol there is added during 1 hour a solution of 39.5 grams p-diisopropenylbenzene in 90 grams benzene saturated with hydrogen chloride. A violent reaction sets in. When the evolution of hydrogen chloride is finished the reaction mixture is neutralized with sodium dicarbonate solution. The crystalline precipitate is isolated and washed with water. The benzene and the excess of 2,6-diethyl-phenol is distilled off in a vacuum. As a residue there are obtained 98 grams α,α,α',α'-tetramethyl-α,α'-di-(4-hydroxy-3,5-diethyl-phenyl)-p-xylene. After recrystallization from benzene the compound has a melting point of about 114°C.

EXAMPLE 9

The process is carried out as described in Example 8, but instead of 2,6-diethyl-phenol there are used 108 grams p-cresol. One obtains 88 grams α,α,α',α'-tetramethyl-α,α'-di-(2-hydroxy-5-methyl-phenyl)-p-xylene with the melting point 176°C.

EXAMPLE 10

To 140 grams melted resorcinol there are added 2 grams pyrophosphurous acid and then, during 4 hours, 39.5 grams p-diisopropenyl benzene. The temperature rises to 120°C. After cooling the excess of resorcinol is washed out with hot water. The residue is dissolved in a 10 percent sodium hydroxide solution. After acidifying the solution with diluted hydrochloric acid the produce precipitates. It is filtered off and dried. There are obtained 59 grams α,α,α',α'-tetramethyl-α,α'-di-(2,4-dihydroxyphenyl)-p-xylene.

We claim:

1. An aromatic polyhydroxy compound selected from the group consisting of 1,3- and 1,4-substituted aryls of the formula

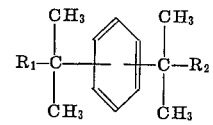

wherein $R_1$ and $R_2$ denote substituents selected from the group consisting of dihydroxyphenyl, phenylhydroxyphenyl, monohydroxyhalophenyl and monohydroxynaphthyl.

2. The compound of claim 1 wherein $R_1$ and $R_2$ are dihydroxyphenyl radicals.

3. The compound of claim 1 wherein $R_1$ and $R_2$ are o,p-dihydroxyphenyl.

4. The compound of claim 1 wherein $R_1$ and $R_2$ are monohydroxynaphthyl radicals.

* * * * *